J. ROTHCHILD & H. S. CONOVER.
FLOAT VALVE.
APPLICATION FILED APR. 16, 1910.
1,007,009.
Patented Oct. 24, 1911.
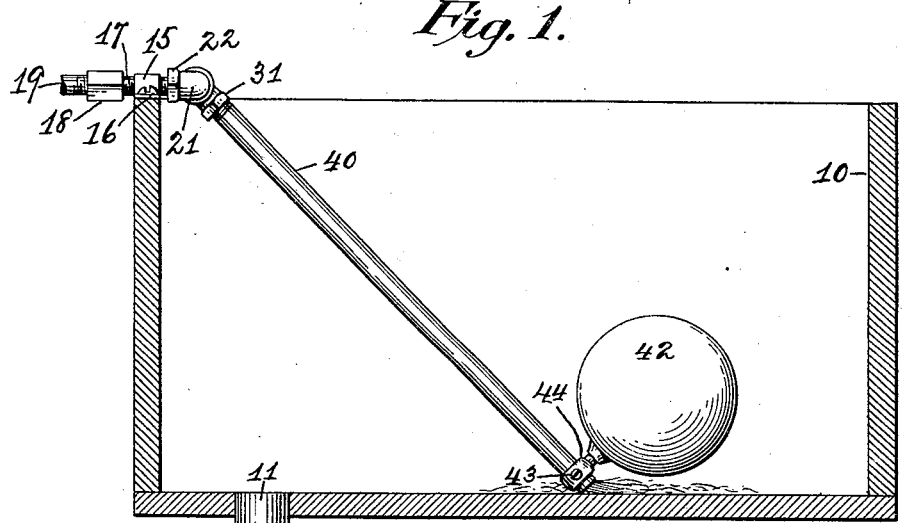
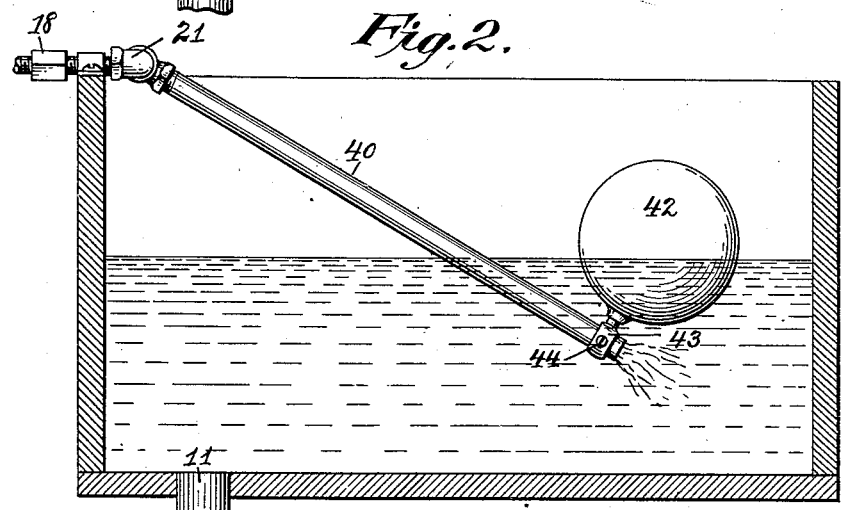
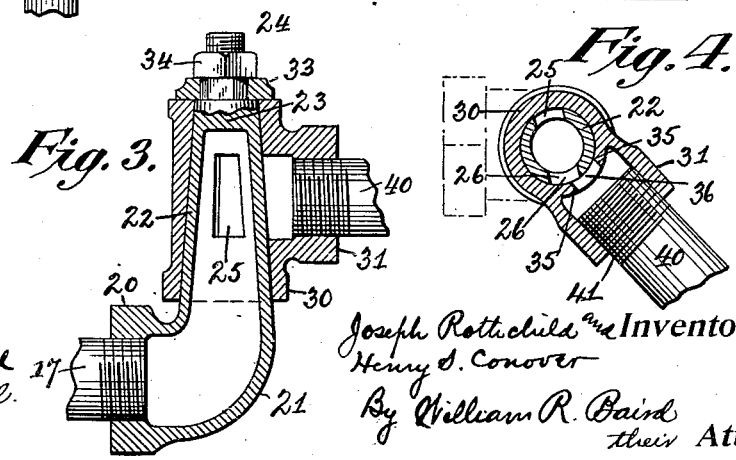

UNITED STATES PATENT OFFICE.

JOSEPH ROTHCHILD, OF NEW YORK, AND HENRY S. CONOVER, OF BROOKLYN, NEW YORK, ASSIGNORS TO THE ROTHCHILD PRESSURE SPECIALTIES COMPANY, OF CANTON, NEW YORK, A CORPORATION OF NEW YORK.

FLOAT-VALVE.

1,007,009.  Specification of Letters Patent.  Patented Oct. 24, 1911.

Application filed April 16, 1910. Serial No. 555,786.

*To all whom it may concern:*

Be it known that we, JOSEPH ROTHCHILD, a citizen of the United States, residing at New York, in the county and State of New York, and HENRY S. CONOVER, a citizen of the United State, residing at Brooklyn, in the county of Kings, in the State of New York, have invented certain new and useful Improvements in Float-Valves, of which the following is a specification.

This invention relates to float valves and is in the nature of an improvement on the construction described and claimed in U. S. Patent to Joseph Rothchild, one of the joint inventors of the present invention, granted February 15, 1910, and numbered 949,635. In that patent the casing does not fit snugly around the plug but has a space between an interior diaphragm and the discharge pipe to the tank. The float is not attached to the discharge pipe but a separate rod or pipe leads from the casing, without communication with the interior thereof, to the outer end of which rod or pipe the float is attached.

The object of the present invention is to simplify and economize the construction by dispensing with the diaphragm in the casing and the extra rod or pipe to connect with the float and to provide in simple economical form a valve having a fixed plug adapted to be connected to a suitable source of water supply, and a rotatable casing mounted on the plug and provided with a lateral discharge pipe, the whole mounted in a tank or reservoir and the discharge pipe being provided with an actuating gravity float whereby the tank is automatically filled to a predetermined point whenever it is emptied.

In the drawings Figure 1 represents a tank or reservoir in vertical section with a valve embodying the invention in side elevation, the tank being empty and the water beginning to enter the same; Fig. 2 is a similar view of the same parts showing the reservoir partly filled and the float elevated; Fig. 3 is an enlarged longitudinal section through the casing and plug, and Fig. 4 is a transverse section of the parts shown in Fig. 3 and on the same scale.

In the drawings 10 represents a tank or reservoir open at the top and provided at the bottom with a discharge orifice 11 which may be governed by a valve (not shown) in the usual manner, it being understood that when the orifice is open, the water, or other contents of the reservoir, will be discharged through it; and when it is closed, the water will be retained in the tank.

Secured at any convenient place near the top of the tank by a strap indicated at 15 and held in place by one or more screws 16 is a supply pipe 17 connected by a coupling 18 to another supply pipe 19. This arrangement is a convenient one for the construction shown, but it will be understood that any form of supply which may be expedient for the situation in which it is to be used will suit the purpose of the invention equally well.

Fixed to the inner end of the supply pipe 17 in any approved manner for instance by a threaded connection, is a hollow plug 20 turned at 21 and having a tapering body 22 in the general form of the frustum of a hollow cone and which body terminates in an end wall 23 impervious to the fluids entering the plug, and which end wall is reduced to a threaded projection 24. A pair of longitudinal openings 25 and 26 are provided in the tapering body 22 and form ports for the passage of the fluids. The part of the plug 20 where it is fixed to the supply pipe is preferably made with external angular faces as at 220 in order that it may readily be turned by a wrench.

Surrounding the plug 20 is a casing 30 hollowed out to fit accurately over the body 22 and provided with an annular projecting flange 31 having external angular faces and internally threaded to receive and engage the externally threaded end 41 of a pipe 40 depending therefrom. A collar 33 fits over the projection 24 and a nut 34 is secured to the threaded end of that projection. This arrangement is such that while the plug is fixed the casing rotates on it smoothly as on a bearing all of the contacting parts having a tight fit. The casing 30 is provided with an inwardly projecting web or diaphragm 35 provided with a passage way 36 which registers with either the port 26 or the port 25 of the plug depending on the positions of the other parts. The pipe 40 reaches down toward the bottom of the tank and at any convenient point along its length is provided with a float 42 secured by a collar 43 and set screw 44 or in any other usual manner.

In using the device, when the water is let out of the tank 10 through the aperture 11, the float 42 falls by gravity and carries with it the pipe 40 to which it is secured. This movement rotates the movable casing 30 on the body 22 of the fixed plug 20 and brings the left edge of the opening 36 past the right edge of the port 26 of the plug. The moment this occurs water begins to flow from the pipes 19 and 17 and the interior of the plug 20 through these passages 26 and 36 and down the interior of the pipe 40 and so out into the bottom of the tank 10. It is obvious that the ports 26 and 36 may be set at any desired relative positions, so that a full opening of the water passage may be secured when the pipe 40 is at any desired angle. As the water pours through the pipe 40 and gradually fills the reservoir 10, the float rises, and in rising lifts up the pipe 40 and so rotates the casing 30 on the plug 20 and gradually causes the left edge of the port 36 to approach the right edge of the port 26 at which point the water is cut off and the valve is closed. Obviously by varying the relative positions of the edges of the ports, the valve can be adjusted to shut off the water at any required level. As the lower or discharge end of the pipe 40 is always below the water level on account of its connection with the float there is no splashing of the water and the operation of the device is practically noiseless. If the casing 30 were rotated so as to bring the ports 36 and 25 in registry, the valve could be used equally well but would have to be located at the bottom of the tank. It is obvious that the ports in either the casing or plug can readily be arranged to accommodate any desired position of the valve or the supply pipe. The float 42 may, by means of collar 43 and set screw 44, be adjusted at any point along the pipe 40 so that the lowermost point to which the float 42 will descend can readily be predetermined. It will be understood of course that the aperture 11 is controlled by any usual form of valve adapted to be operated from outside of the tank. This is not shown because any workman skilled in the art can readily supply one.

What we claim as new is:—

1. A valve comprising a means of water supply, a discharge pipe serving as a valve operating lever, a sleeve rotatably and slidably mounted on the discharge pipe adjacent its free end, and a float ball attached on the periphery of the sleeve.

2. A float valve comprising a casing and a hollow plug therein, the casing and plug being provided with coacting ports, a pipe through which the liquid passing through the valve is discharged, and which serves as a valve operating lever, a sleeve rotatably and slidably mounted on the discharge pipe adjacent its free end, and a float ball attached on the periphery of the sleeve.

3. A float valve comprising a casing and a hollow plug therein, the casing and plug having coacting ports, a pipe attached to the casing in free communication with the port thereof and serving as a discharge pipe and a lever to rotate the casing on the plug, a sleeve rotatably and slidably mounted on the pipe adjacent its free end, and a float ball attached on the periphery of the sleeve.

In testimony whereof we affix our signatures in presence of two witnesses.

JOSEPH ROTHCHILD.
HENRY S. CONOVER.

Witnesses:
E. W. SCHERR, Jr.,
ALAN C. McDONNELL.